United States Patent
Ng et al.

(10) Patent No.: US 11,568,218 B2
(45) Date of Patent: Jan. 31, 2023

(54) NEURAL NETWORK PROCESSING SYSTEM HAVING HOST CONTROLLED KERNEL ACCLERATORS

(71) Applicant: Xilinx, Inc., San Jose, CA (US)

(72) Inventors: Aaron Ng, San Jose, CA (US); Jindrich Zejda, Saratoga, CA (US); Elliott Delaye, San Jose, CA (US); Xiao Teng, Cupertino, CA (US); Ashish Sirasao, San Jose, CA (US)

(73) Assignee: XILINX, INC., San Jose, CA (US)

( * ) Notice: Subject to any disclaimer, the term of this patent is extended or adjusted under 35 U.S.C. 154(b) by 1035 days.

(21) Appl. No.: 15/786,288

(22) Filed: Oct. 17, 2017

(65) Prior Publication Data

US 2019/0114535 A1    Apr. 18, 2019

(51) Int. Cl.
   *G06N 3/063* (2006.01)
   *G06N 3/04* (2006.01)

(52) U.S. Cl.
   CPC ........... *G06N 3/063* (2013.01); *G06N 3/0454* (2013.01)

(58) Field of Classification Search
   CPC ......... G06N 3/063; G06N 3/0454; G06N 3/05
   USPC .......................................................... 706/41
   See application file for complete search history.

(56) References Cited

U.S. PATENT DOCUMENTS

| 6,346,825 B1 | 2/2002 | Pang et al. | |
| 2010/0076915 A1* | 3/2010 | Xu | G06N 3/084 706/25 |
| 2017/0124451 A1* | 5/2017 | Barham | G06F 9/5038 |

FOREIGN PATENT DOCUMENTS

WO    2016077393 A1    5/2016

OTHER PUBLICATIONS

Flexible On-Chip Memory Architecture for DCNN Accelerators (Year: 2017).*
Maximizing CNN Accelerator Efficiency Through Resource Partitioning (Year:2017).*
Wu, Zonghan, et al. "A comprehensive survey on graph neural networks." IEEE transactions on neural networks and learning systems 32.1 (2020): 4-24 (Year: 2020).*

(Continued)

*Primary Examiner* — Omar F Fernandez Rivas
*Assistant Examiner* — Eric C Wu
(74) *Attorney, Agent, or Firm* — Crawford Maunu PLLC

(57) ABSTRACT

A disclosed neural network processing system includes a host computer system, a RAMs coupled to the host computer system, and neural network accelerators coupled to the RAMs, respectively. The host computer system is configured with software that when executed causes the host computer system to write input data and work requests to the RAMS. Each work request specifies a subset of neural network operations to perform and memory locations in a RAM of the input data and parameters. A graph of dependencies among neural network operations is built and additional dependencies added. The operations are partitioned into coarse grain tasks and fine grain subtasks for optimal scheduling for parallel execution. The subtasks are scheduled to accelerator kernels of matching capabilities. Each neural network accelerator is configured to read a work request from the respective RAM and perform the subset of neural network operations on the input data using the parameters.

20 Claims, 14 Drawing Sheets

(56) References Cited

OTHER PUBLICATIONS

Ji, Tao, Yuanbin Wu, and Man Lan. "Graph-based dependency parsing with graph neural networks." Proceedings of the 57th Annual Meeting of the Association for Computational Linguistics. 2019 (Year: 2019).*

Gupta, Deepak, Sarah Kohail, and Pushpak Bhattacharyya. "Combining graph-based dependency features with convolutional neural network for answer triggering." arXiv preprint arXiv:1808.01650 (2018) (Year: 2018).*

Yongming Shen et al., Maximizing CnN Accelerator Efficiency Through Resource partititoning:, Proceedings of the 44th Annual International Symposium on Computer Architecture, ISCA '17, Jun. 24, 2017, pp. 535-547, ACM Press, New York, NY USA.

Zhen Li et al., A Survey of Neural Network Accelerators, Frontiers of Computer Science, Springer Berlin Heidelberg, Berlin/Heidelberg, vol. 11, No. 5, May 17, 2017, pp. 746-761.

Kalin Ovtcharov et al., Accelerating deep convolutional neural networks using specialized hardware, Microsoft White Paper, Feb. 22, 2015, retrieved from the internet: URL:https://www.microsoft.com/en-us/research/wp-content//uploads/2016/02/CNN20Whitepaper.pdfhttp://research.microsoft.com/pubs/240715/CNN Whitepaper.pdf (retreived on Sep. 9, 2016).

Morman P. Jouppi et al., In-Datacenter Performance Analysis of a Tensor Processing Unit, Proceedings of the 44th Annual International Symposium on Computer Architecture, ISCA '17, Jun. 24, 2017, pp. 1-12, ACM Press, New York, NY, USA.

Jiantao Qiu et al. "Going Deeper with Embedded FPGA Platform for Convolutional Neural Network", Proceedings of the 2016 ACM/SIGDA International Symposium on Field-Programmable Gate Arrays, FPGA '16, Jan. 1, 2016, pp. 26-35.

Chetlur, Sharan et al., "cuDNN: Efficient Primitives for Deep Learning," submitted Oct. 3, 2014, pp. 1-9, https://arxiv.org/pdf/1410.0759.pdf, Cornell University Library.

Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.

Gysel, Philipp, "Ristretto: Hardware-Oriented Approximation of Convolutional Neural Networks," May 20, 2016, pp. 1-73, https://arxiv.org/abs/1605.06402, Cornell University Library.

Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.

Krizhevsky, Alex et al., "ImageNet Classification with Deep Convolutional Neural Networks," Proc. of the 12th International Conference on Neural Processing Systems, Dec. 3, 2012, pp. 1097-1105, ACM Digital Library, www.acm.org.

Mathworks, "im2col," dowloaded Sep. 22, 2017 from https://www.mathworks.com/help/images/ref/im2col.html?searchHighlight=im2col&s_tid=doc_srchtitle, pp. 1-3.

Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/, pp. 1-15.

Shaaban, Muhammed, "Systolic Architectures," Mar. 11, 2003, Kate Gleason College of Engineering, Rochester Institute of Technology, Rochester, New York, USA.

Warden, Pete, "Why GEMM is at the heart of deep learning," Apr. 20, 2015, pp. 1-9, downloaded from https://petewarden.com/2015/04/20/why-gemm-is-at-the-heart-of-deep-learning/.

Wikipedia, "Convolutional neural network," Sep. 20, 2017, pp. 1-13, downloaded from https://en.wikipedia.org/wiki/Convolutional_neural_network.

Wikipedia, "Deep learning," Sep. 24, 2017, pp. 1-13, downloaded from https://en.wikipedia.org/wiki/Deep_learning.

Wikpedia, "Matrix Multiplication," Sep. 20, 2017, pp. 1-19, downloaded from https://en.wikipedia.org/wiki/Matrix_multiplication.

Wikipedia, "Multiprocessing," May 10, 2017, pp. 1-4, dowloaded from https://en.wikipedia.org/wiki/Multiprocessing.

Wikipedia, "Producer-consumer problem," Sep. 7, 2017, pp. 1-9, downloaded from https://en.wikipedia.org/wiki/Producer%E2%80%93consumer_problem.

Wikipedia, "Row- and colum-major order," Aug. 23, 2017, pp. 1-5, downloaded from https://en.wikipedia.org/wiki/Row-_and_column-major_order.

Wikipedia, "Systolic array," Mar. 22, 2017, pp. 1-5, downloaded from https://en.wikipedia.org/wiki/Systolic_array.

Wikipedia, "Very long instruction word," Jul. 13, 2017, pp. 1-3, downloaded from https://en.wikipedia.org/wiki/Very_long_instruction_word.

Xilinx, "Smarter Data Center," downloaded Sep. 22, 2017 from https://www.xilinx.com/applications/data-center.html, pp. 1-4, Xilinx, Inc., San Jose, California, USA.

Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.

Xilinx, "UltraScale Architecture DSP Slice User Guide," UG579 (v1.3), Nov. 24, 2015, pp. 1-74, Xilinx, Inc., San Jose, California, USA.

Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.

Xilinx, "Deep Learning with INT8 Optimization on Xilinx Devices," WP486 (v1.0.1), Apr. 24, 2017, pp. 1-11, Xilinx, Inc., San Jose, California, USA.

Xilinx, "Implementing Memory Structures for Video Processing in the Vivado HLS Tool," XAPP793 (v1.0), Sep. 20, 2012, pp. 1-8, Xilinx, Inc., San Jose, California, USA.

Xilinx, "Two-Dimensional Linear Filtering," XAPP933 (v1.1), Oct. 23, 2007, pp. 1-8, Xilinx, Inc., San Jose, California, USA.

* cited by examiner

NEURAL NETWORK PROCESSING SYSTEM HAVING HOST CONTROLLED KERNEL ACCLERATORS

TECHNICAL FIELD

The disclosure generally relates to neural network processing.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tanh) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

Field programmable gate arrays (FPGAs) have been used to implement circuits that accelerate functions called from software. Circuits that accelerate functions called from software are referred to as hardware accelerators. Examples of hardware accelerators include various image filters implemented as FPGA circuits that can be called from image processing software.

Some FPGA-based products are implemented as multiple FPGA dies attached to a silicon interposer and packaged as a single device. Implementing a hardware accelerator on multiple FPGA dies may not be feasible for some applications because the interconnect between FPGA dies may not provide the bandwidth needed to achieve a desired level of performance. In addition, placing and routing a hardware accelerator on multiple dies may be problematic due to limitations of the inter-die interconnect.

SUMMARY

A disclosed neural network processing system includes a host computer system, a plurality of RAMs coupled to the host computer system, and a plurality of neural network accelerators coupled to the plurality of RAMs, respectively. The host computer system is configured with software that when executed causes the host computer system to write input data and work requests to the RAMS. Each work request specifies a subset of neural network operations to perform and specifies memory locations in a RAM of the input data and parameters for performing the work request. Each neural network accelerator is configured to read a work request from the respective RAM and perform the subset of neural network operations on the input data using the parameters.

A disclosed method of neural network processing includes writing by a host computer system, input data matrices to a plurality of RAMs shared by the host computer system and a plurality of neural network accelerators. The plurality of RAMs are coupled to the plurality of neural network accelerators, respectively. The method further includes writing work requests to the RAMs. Each work request specifies memory locations in a respective RAM of the plurality of RAMs of: a respective weights matrix, a respective input data matrix of the input data matrices, and a respective output matrix. Each work request further specifies a subset of neural network operations to perform. The method reads work requests from the respective RAMs by the neural network accelerators, and the neural network accelerators perform the subsets of neural network operations specified by the work requests using the respective weights matrices, input data matrices, and output matrices referenced by the work requests.

Other features will be recognized from consideration of the Detailed Description and Claims, which follow.

BRIEF DESCRIPTION OF THE DRAWINGS

Various aspects and features of the disclosed method and system will become apparent upon review of the following detailed description and upon reference to the drawings in which.

DETAILED DESCRIPTION

Figure 1:
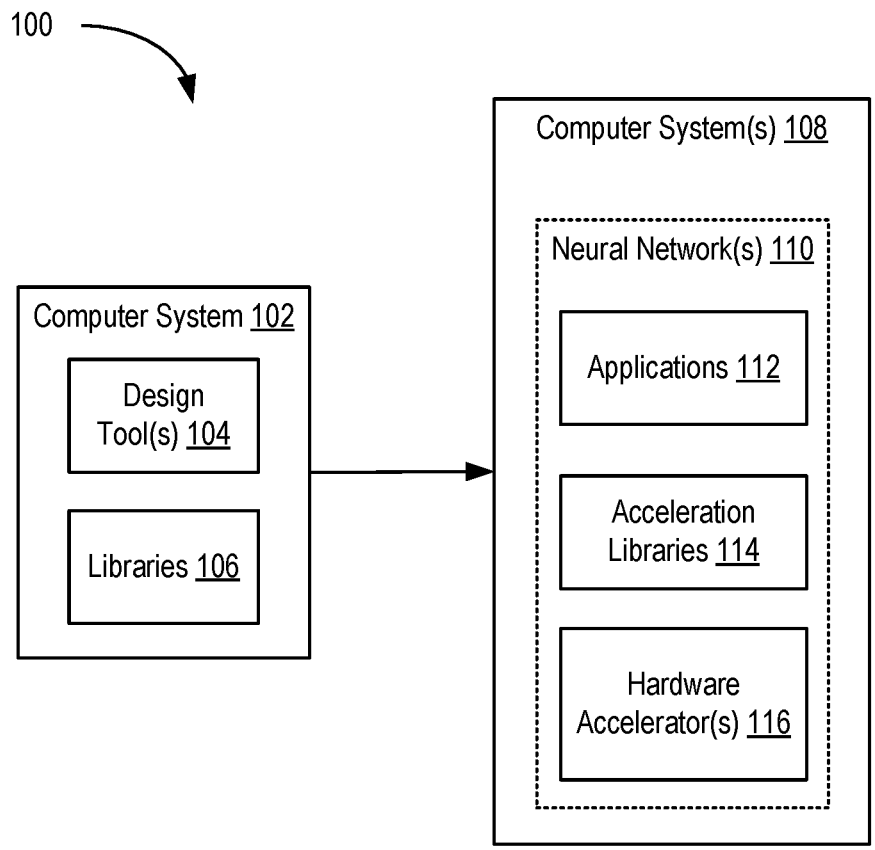
FIG. 1 is a block diagram depicting a system for implementing neural networks according to an example.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed implementations provide a neural network processing system in which a host computer system directs the processing by multiple neural network accelerators on separate integrated circuit (IC) dice. The disclosed methods and systems are applicable to convolutional neural networks (CNNs), recurrent neural networks (RNNs) and other neural networks involving operations such as matrix multiplication or convolution. For brevity, the host computer system may also be referred to as a "host," and a neural network accelerator may also or alternatively be referred to as an "acceleration circuit," a "kernel accelerator" or a "kernel accelerator circuit." The host receives an input data set for processing and partitions, reshapes, or merges the input data set into data matrices for processing by the neural network accelerators. Each neural network accelerator can be implemented on a separate integrated circuit die and operate independently from the other neural network accelerator(s). To increase throughput, the host can optionally add further dependencies to a specification of dependencies of neural network operations such that the dependencies control the order in which the tasks are submitted by the host to the neural network accelerators.

Each neural network accelerator has one or more dedicated RAMs through which data is passed between the host and the accelerator circuit and in which constant data used by the accelerator circuit is stored. For some implementations one RAM can store input and output data, and another RAM can store weights used in matrix multiplication.

In one implementation, the host schedules neural network operations according to a coarse-grained parallelization of operations, and in an alternative implementation, the host schedules neural network operations according to a fine-grained parallelization of operations. In a coarse-grained parallelization, each neural network accelerator performs a similar, independent unit of work, such as convolution on a batch of images. In a fine-grained parallelization of operations, a task is divided into subtasks and the subtasks issued to different neural network accelerators, such as partitioning an image into smaller matrices for processing by different neural network accelerators. The host writes input data matrices to the RAMs of the neural network accelerators for processing and specifies to the neural network accelerators the locations of the input and weight matrices in the RAMs and the neural network operations to be performed.

FIG. 1 is a block diagram depicting a system 100 for implementing neural networks according to an example. The system 100 includes a computer system 102 and one or more computer systems 108. The computer system 102 includes conventional computing components configured to execute software that provides one or more design tools 104. Each computer system 108 implements one or more neural networks 110. The neural network(s) 110 are implemented using applications 112, acceleration libraries 114, and one or more hardware accelerators 116.

In an example, the hardware accelerator(s) 116 include programmable integrated circuits (ICs), such as field programmable gate arrays (FPGAs). The acceleration libraries 114 provide application programming interfaces (APIs) to interface with the hardware accelerator(s) 116. The acceleration libraries 114 can also include libraries that provide neural network functions, including predefined and optimized implementations of neural network layers and other types of neural network structures. Thus, the neural network(s) 110 can include both hardware portions implemented in the hardware accelerator(s) 116, as well as software portions implemented in the acceleration libraries 114. The applications 112 invoke the APIs of the acceleration libraries 114 to program and control the hardware accelerator(s) 116 to implement the neural network(s) 116.

A designer interacts with the design tool(s) 104 to define the neural network(s) 110. The design tool(s) 104 can generate files for programming the hardware accelerator(s) 116 (e.g., configuration bitstreams for FPGAs), files that provide the acceleration libraries 114, and files that provide the applications 112. The designer can define the hardware portions of the neural network(s) 110 using a register transfer language (RTL) or using a programming language, such as C, C++, OpenCL, and the like, or a combination of RTL and programmable language(s). The user can define the software portions of the neural network(s) 110 using a programming language, such as C, C++, OpenCL, etc. The design tool(s) 104 compile the software-defined neural networks to generate files for programming the hardware accelerator(s) 116 and library files for the acceleration libraries 114. The designer can make use of libraries 106 that provide class libraries, template libraries, and the like to assist in developing the hardware and software portions of the neural network(s) 110.

A user can define the applications 112 using a programming language (e.g., C, C++, Python, etc.). The user can make use of neural network frameworks and libraries, such as Caffe, TensorFlow, MXNet, and the like.

Figure 2:
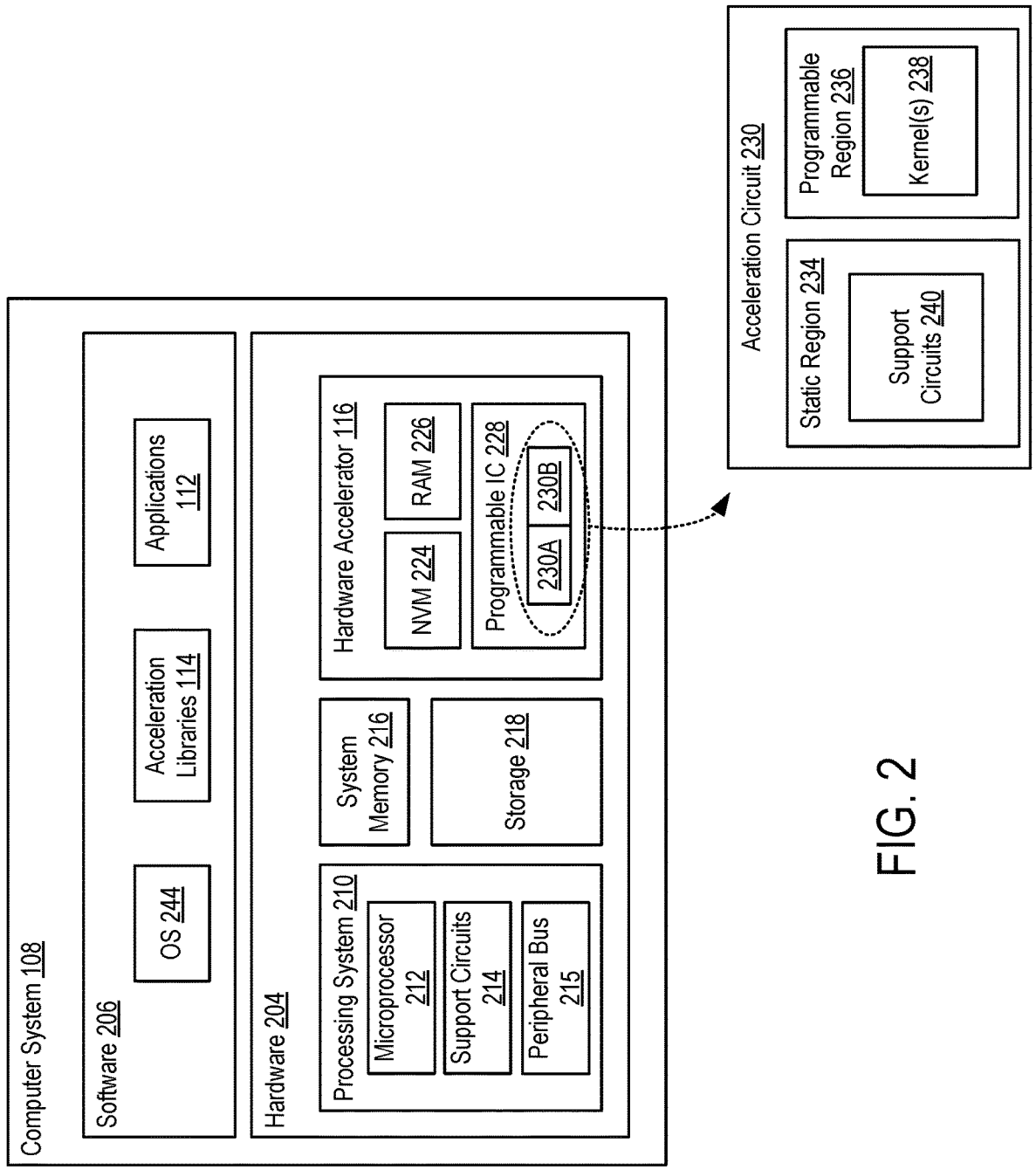
FIG. 2 is a block diagram depicting a computing system according to an example.

FIG. 2 is a block diagram depicting a computing system 108 according to an example. The computing system 108 includes hardware 204 and software 206 executing on the hardware 204. The hardware 204 includes a processing system 210, system memory 216, storage devices ("storage 218"), and a hardware accelerator 116. The software 206 includes an operating system (OS) 244, the acceleration libraries 114, and the applications 112. The processing system 210, system memory 216, and storage 218 comprise a host computer system as referenced herein.

The processing system 210 includes a microprocessor 212, support circuits 214, and a peripheral bus 215. The microprocessor 212 can be any type of general-purpose central processing unit (CPU), such as an x86-based processor, ARM®-based processor, or the like. The microprocessor 212 can include one or more cores and associated circuitry (e.g., cache memories, memory management units (MMUs), interrupt controllers, etc.). The microprocessor 212 is configured to execute program code that perform one or more operations described herein and which can be stored in the system memory 216 and/or the storage 218. The support circuits 214 include various devices that cooperate with the microprocessor 212 to manage data flow between the microprocessor 212, the system memory 216, the storage 218, the hardware accelerator 116, or any other peripheral device. For example, the support circuits 214 can include a chipset (e.g., a north bridge, south bridge, platform host controller, etc.), voltage regulators, firmware (e.g., a BIOS), and the like. The support circuits 214 manage data flow between the microprocessor 212 and the peripheral bus 215, to which various peripherals, such as the hardware accelerator 116, are connected. In some examples, the microprocessor 212 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 210 is shown separate from the hardware accelerator 116. In other examples discussed further below, the processing system 210 and the hardware accelerator 116 can be implemented on the same integrated circuit (IC) using a System-On-Chip (SoC).

The system memory 216 is a device allowing information, such as executable instructions and data, to be stored and retrieved. The system memory 216 can include, for example, one or more random access memory (RAM) modules, such as double-data rate (DDR) dynamic RAM (DRAM). The storage device 218 includes local storage devices (e.g., one or more hard disks, flash memory modules, solid state disks, and optical disks) and/or a storage interface that enables the computing system 108 to communicate with one or more network data storage systems. The hardware 204 can include various other conventional devices and peripherals of a computing system, such as graphics cards, universal serial bus (USB) interfaces, and the like.

The hardware accelerator 116 includes a programmable IC 228, a non-volatile memory 224, and RAM 226. The programmable IC 228 can be an FPGA or the like or an SoC having an FPGA or the like. The NVM 224 can include any type of non-volatile memory, such as flash memory or the like. The RAM 226 can include DDR DRAM or the like. The programmable IC 228 is coupled to the NVM 224 and the RAM 226. The programmable IC 228 is also coupled to the peripheral bus 215 of the processing system 210.

The OS 244 can be any commodity operating system known in the art, such as Linux®, Microsoft Windows®, Mac OS®, or the like. The acceleration libraries 114 includes drivers and libraries that provide APIs for command and control of the hardware accelerator 116. The applications 112 include software executing on the microprocessor 212 that invokes the APIs of the acceleration libraries 114 to implement neural network(s).

In operation, the programmable IC 228 is configured with an acceleration circuit 230. The acceleration circuit 230 generally includes a base platform 230A and a neural network accelerator 230B. For example, the acceleration circuit 230 can be implemented using a static region 234 and a programmable region 236. The static region 234 includes support circuits 240 for providing an interface to the peripheral bus 215, the NVM 224, and the RAM 226. The programmable region 236 can include one or more neural network accelerators ("kernel(s) 238"). The base platform 230A is implemented using the static region 234, and the neural network accelerator 230B is implemented using the programmable region 236. In another example, the base platform 230A can also be implemented using a portion of the programmable region 236. Thus, in some examples, the programmable region 236 also includes some interface circuits. In some examples, the acceleration circuit 230 can include more than one programmable region 236, each of which can be individually configured with neural network accelerator(s) 238.

The static region 234 is "static" in that the circuitry thereof remains constant across reconfigurations of the programmable region 236. In an example, the support circuits 240 include PCIe endpoint circuits, a direct memory access (DMA) controller, interconnects, a memory controller, a memory interface circuit (e.g., a DDR interface), decoupler circuits (to support partial reconfiguration), a flash programmer, debug circuits, and the like. In some examples, the programmable region 236 does not include any of the support circuits 240. In other examples, some support circuits are implemented in the programmable region 236. In such case, the programmable region 236 can be referred to as an "expanded programmable region." In either case, in one example, some support circuits 240 are always present in the static region 234, such as the PCIe circuits and the DMA circuits.

Figure 3:
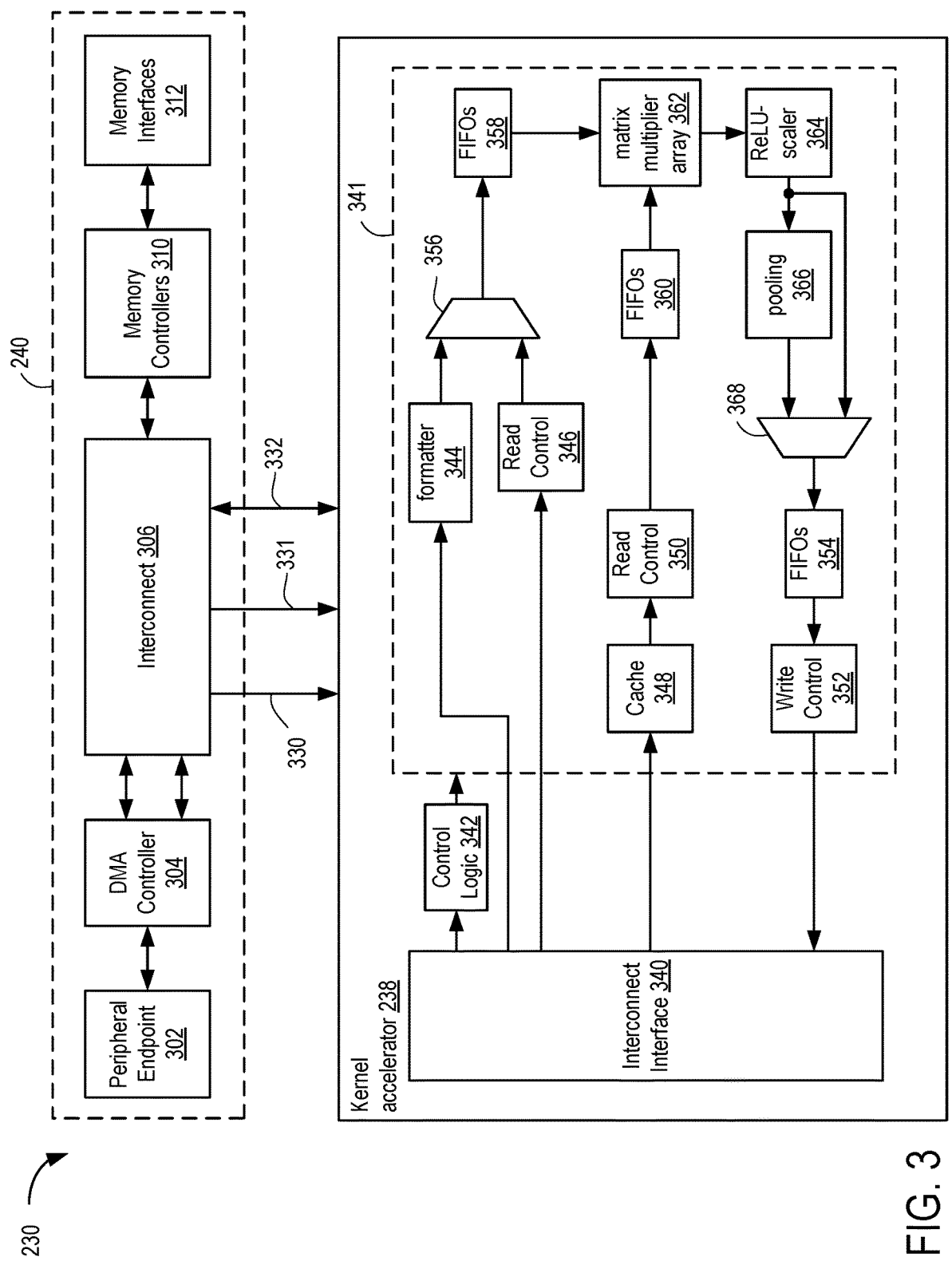
FIG. 3 is a block diagram depicting an acceleration circuit according to an example.

FIG. 3 is a block diagram depicting an acceleration circuit 230 according to an example. The acceleration circuit 230 includes the support circuits 240 and a neural network accelerator 238. In the example, the support circuits 240 include a PCIe endpoint circuit ("PCIe endpoint 302"), a PCIe DMA controller 304, interconnect circuits ("interconnect 306"), memory controllers 310, and memory interfaces 312. The support circuits 240 can include other circuits, which are omitted for clarity (e.g., decoupler circuits, debug circuits, etc.). The PCIe endpoint 302 provides a physical interface to the peripheral bus 215. The PCIe DMA controller 304 facilitates DMA operations to the RAM 226 and the neural network accelerator 238. The interconnect 306 couples the PCIe DMA controller 304 to the memory controllers 310 and to the neural network accelerator 238. The memory controllers 310 are coupled to the memory interfaces 312. The memory interfaces 312 are coupled to the RAM 226.

In operation, the acceleration libraries 114 can access the RAM 226 directly through the PCIe DMA controller 304. The acceleration libraries 114 can also access the neural network accelerator 238 through the PCIe DMA controller 304. The neural network accelerator 238 can access the RAM 226 through the memory controllers 310. Data can be exchanged between the software 206 and the neural network accelerator 238 using DMA operations between the system memory 216 and the RAM 226.

In the example, the neural network accelerator 238 uses interfaces 330, 331, and 332 to communicate with the interconnect 306. In particular, these interfaces include a first read interface 330, a second read interface 331, and a read/write interface 332. For example, the read interface 330 can be used as a control interface for controlling the neural network accelerator 238. The read interface 331 can be used to read from the RAM 226 through a first one of the memory interfaces 312. The read/write interface 332 can be used to read and write from the RAM 226 through a second one of the memory interfaces 312.

The neural network accelerator 238 includes an interconnect interface 304, control logic 342, and processing circuits 341. The processing circuits 341 include a formatter circuit 344 circuit (e.g., IM2COL), a read control circuit ("read control 346"), a multiplexer 356, first-in-first-out circuits ("FIFOs 358"), matrix multiplier array 362, a ReLU-scaler circuit 364, a pooling circuit 366 (e.g., maxpool), a multiplexer 368, FIFOs 354, a write control circuit ("write control 352"), a cache 348, a read control circuit ("read control 350"), and FIFOs 360. The interconnect interface 340 is coupled to the interfaces 330, 331, and 332, the control logic 342, and the processing circuits 341. The interconnect interface 340 can include switches, clock converters, and the like to facilitate communication between the control logic 342 and the interface 330, as well as between the processing circuits 341 and the interfaces 331 and 332.

In the example, the interconnect interface 340 is coupled to inputs of the formatter circuit 344, the read control circuit 346, the cache 348, and the write control circuit 352. Outputs of the formatter circuit 344 and the read control circuit 346 are coupled to inputs of the multiplexer 356. An output of the multiplexer 356 is coupled to an input of the FIFOs 358. An output of the FIFOs 358 is coupled to a first input of the matrix multiplier array 362. An output of the cache 348 is coupled to an input of the read control circuit 350. An output of the read control circuit 350 is coupled to an input of the FIFOs 360. An output of the FIFOs 360 is coupled to a second input of the matrix multiplier array 362. An output of the matrix multiplier array 362 is coupled to an input of the ReLU-scaler 364. An output of the ReLU-scaler 364 is coupled to an input of the pooling circuit 366 and an input of the multiplexer 368. An output of the pooling circuit 366 is coupled to another input of the multiplexer 368. An output of the multiplexer 368 is coupled to an input of the FIFOs 354. An output of the FIFOs 354 is coupled to the write control circuit 352.

In operation, the matrix multiplier array 362 performs matrix multiplication operations for implementing a neural network. The inputs of the matrix multiplier array 362 receive input activation matrices from the FIFOs 358 and weight matrices from the FIFOs 360. The input activation matrices can be read directly from the RAM 226 using the read control circuit 346. Alternatively, the input activations can be read from the RAM 226 and processed by the formatter circuit 344 for input to the matrix multiplier array 362. Weight matrices can be read from the RAM 226 by the read control circuit 350 and cached in cache 348. The ReLU-scaler 364 performs an activation function and can scale the output of the matrix multiplier array 362. The pooling circuit 366 can implement a max pooling function on the scaled output of the matrix multiplier array 362. In one example, the pooling circuit 366 is implemented using CLBs or other configurable logic. Either the output of the pooling circuit 366 or the ReLU-scaler 364 can be stored in the FIFOs 354. The write control circuit 352 writes data in the FIFOs to the RAM 226. The control logic 342 controls the various circuits in the processing circuits 341, such as the formatter circuit 344, the read control circuit 346, the multiplexers 356 and 368, the read control circuit 350, the ReLU-scaler 364, the pooling circuit 366, and the write control circuit 352.

Figure 4:
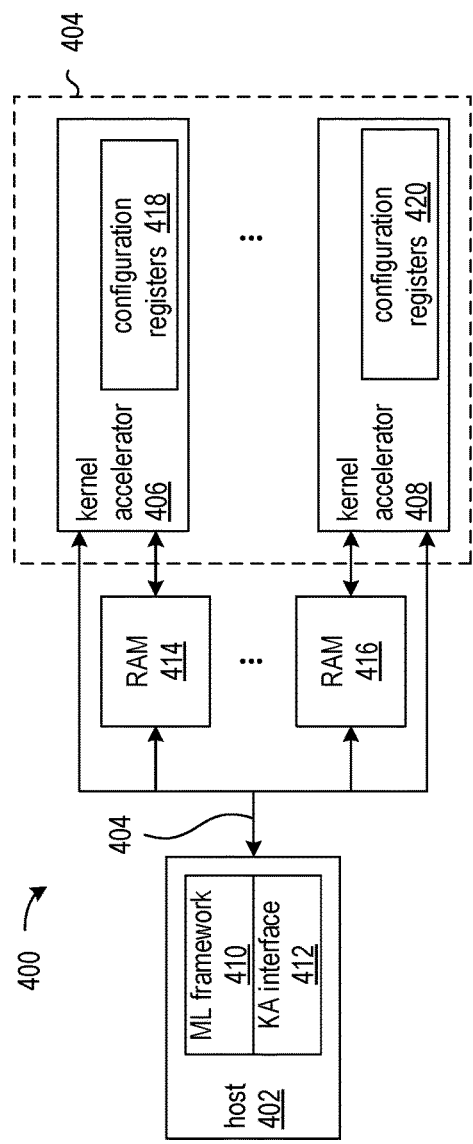
FIG. 4 shows an exemplary neural network processing system according to one implementation.

FIG. 4 shows an exemplary neural network processing system 400 according to one implementation. The system includes a host computer system 402 communicatively coupled to an accelerator platform 404. The host computer system 402 can include the processing system 210, system memory 216, and storage 218 as shown in FIG. 2. The accelerator platform 404, which can be implemented as hardware accelerator 116, has multiple neural network accelerator (KA) circuits, two of which are shown as neural network accelerator 406 and neural network accelerator 408. The host computer system 402 is specifically programmed by a machine learning (ML) framework 410 and a KA interface 412. The ML framework program, which corresponds to the applications 112 of FIG. 1, specifies a particular neural network application, for example, image or speech processing, and the KA interface, which can be implemented as acceleration libraries as in FIG. 1, initiates neural network operations on the neural network accelerators in response to requests for neural network processing from the ML framework. The neural network accelerators 406 and 408 are coupled to dedicated RAMs 414 and 416, respectively. The RAMs are dedicated in that neural network accelerator 406 has access to RAM 414 and neural network accelerator 408 does not. Similarly, neural network accelerator 408 has access to RAM 416 and neural network accelerator 406 does not. The RAMs 414 and 416 can be implemented as RAM 226 in the hardware accelerator 116 of FIG. 2. The neural network accelerators 406 and 408 have sets of configuration registers 418 and 420, respectively. The sets of configuration registers are accessible to the KA interface 412 for storing locations of memory buffers in the associated RAMs 414 and 416 and configuration parameters for neural network operations, such as matrix dimensions for general matrix multiplication (GEMM) and the stride/window for convolution.

Figure 5:
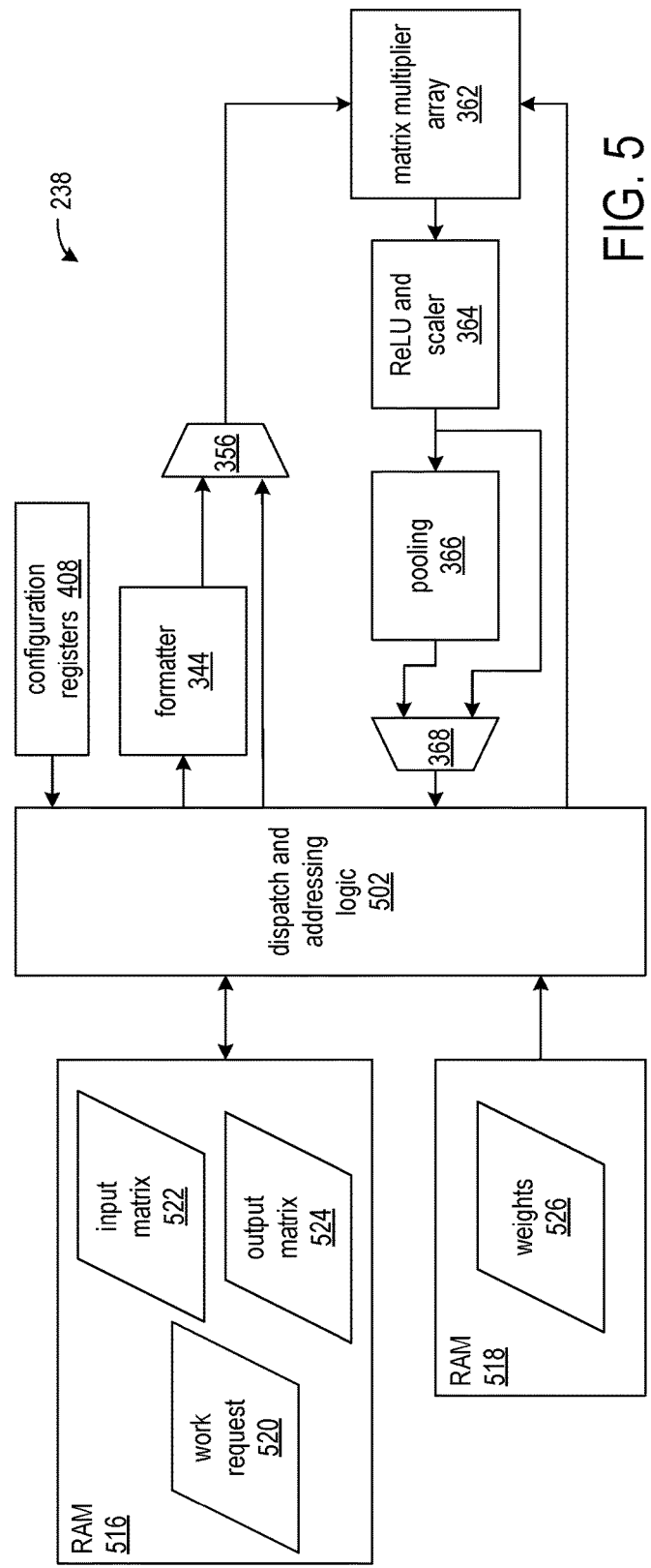
FIG. 5 shows an exemplary neural network accelerator according to one implementation.

The disclosed approaches are not limited to any specific hardware platforms. However, for purposes of providing a frame of reference to those skilled in the art, an exemplary accelerator platform 404 is a KINTEX® ULTRASCALE™ 115 device, which is available from Xilinx, Inc. The device has two super logic regions (SLRs) having FPGA circuitry, and a neural network accelerator can be implemented on each of the SLRs. The SLRs are disposed on separate dies and mounted on a silicon interposer. The RAMs 414 and 416 are DDR SDRAMs and are mounted on a printed circuit board along with the accelerator platform. In one implementation, each of the RAMs comprises two physically separate RAMs as shown in FIG. 5. The interface between host 402 and the RAMs 414 and 416 and between the host and neural network accelerator is Peripheral Component Interconnect Express (PCIE). The neural network accelerators use direct memory access (DMA) channels to map some of the host memory to RAMs 414 and 416 and to configuration registers 418 and 420. The host computer system 402 can be any computer system or combination or network of computer systems suitable for executing an ML framework 410 and KA interface 412. Examples of ML frameworks include TensorFlow™, Caffe, and MXNet.

The KA interface 412 receives a stream of neural network requests from the ML framework 410 and packages the neural network requests into work requests that are routed to the neural network accelerators 406 and 408 via the RAMs 414 and 416 for processing. The KA interface enqueues the work requests for dispatch to the neural network accelerators. Each work request specifies memory locations in a RAM of a respective weights matrix, a respective input data matrix, and a respective output data matrix. Each work request further specifies a subset of neural network operations to perform. Examples of neural network operations include matrix multiplication, maxpool processing, rectified linear unit processing, image-to-column formatting, etc. The KA interface writes the input data from the stream of neural network requests as input matrices in the RAMs 414 and 416 when the associated work requests are dispatched to the neural network accelerators 406 and 408.

Each of the neural network accelerators 406 and 408 reads work requests from the respective RAMs and performs the neural network operations using the weights matrix and the input data matrix as specified in the work requests. The KA interface 412 signals a neural network accelerator when a work request is ready to be processed.

In various implementations, the KA interface 412 partitions, reshapes, or merges an input data set form the ML framework 410 according to the requested neural network operations and/or the capabilities of each of the neural network accelerators 406 and 408. The capabilities of the neural network accelerators can be specified as descriptions in an input data file. In partitioning an input data set, the KA interface can write different sizes of input data matrices to the RAMs 414 and 416 for processing by the neural network accelerators.

FIG. 5 shows another view of the exemplary neural network accelerator 238 of FIG. 3. The neural network accelerator 500 includes configuration registers 408, dispatching and addressing logic circuitry 502 (that implement the read and write controls of FIG. 3), formatter circuit 344, matrix multiplier circuitry 362, rectifier liner unit circuit (RELU) circuit 364, and pooling circuitry 366. Multiplexers 356 and 368 are controlled by the dispatch and addressing logic according to the specified neural network operations. In the exemplary implementation, the neural network accelerator 500 is coupled to two DDR RAMs 516 and 518. RAM 516 stores a work request 520, an input data matrix 522, and an output data matrix 524. RAM 518 stores a weights matrix 526.

The dispatch and addressing circuit 502 reads the work request 520 and initiates the specified neural network operations with the data referenced in the work request. The dispatch and addressing circuit controls multiplexer 356 to select between input data read from the RAM 516 and formatted data from formatter circuit 344. The formatter circuit 344 translates input data from a format provided by the ML framework to a format suitable for the matrix multiplier circuit 362. For example, in one implementation, the formatter circuit converts image data into column data (im2col). In another implementation, the formatter circuit translates row-major or column-major format to a custom hybrid row/column major format that matches the compute array geometry. The matrix multiplier 362 performs matrix multiplication between the input data and the weights matrix 526. In one implementation, the matrix multiplication circuit is a systolic array of multiplier-accumulator circuits. RELU circuit 364 implements an activation function and a scaling function for the neural network. The pooling circuit 366 reduces the spatial size of the data between convolution layers in order to reduce the computational requirements imposed on successive layers. Reduction of the spatial size also aids in avoiding overfitting. In an exemplary application, the pooling circuit implements the maxpool function. The dispatch and addressing circuit controls multiplexer 368 to select between data from the RELU and scaling circuit 364 and data from the pooling circuit 366 for storing as the output matrix 524.

Figure 6:
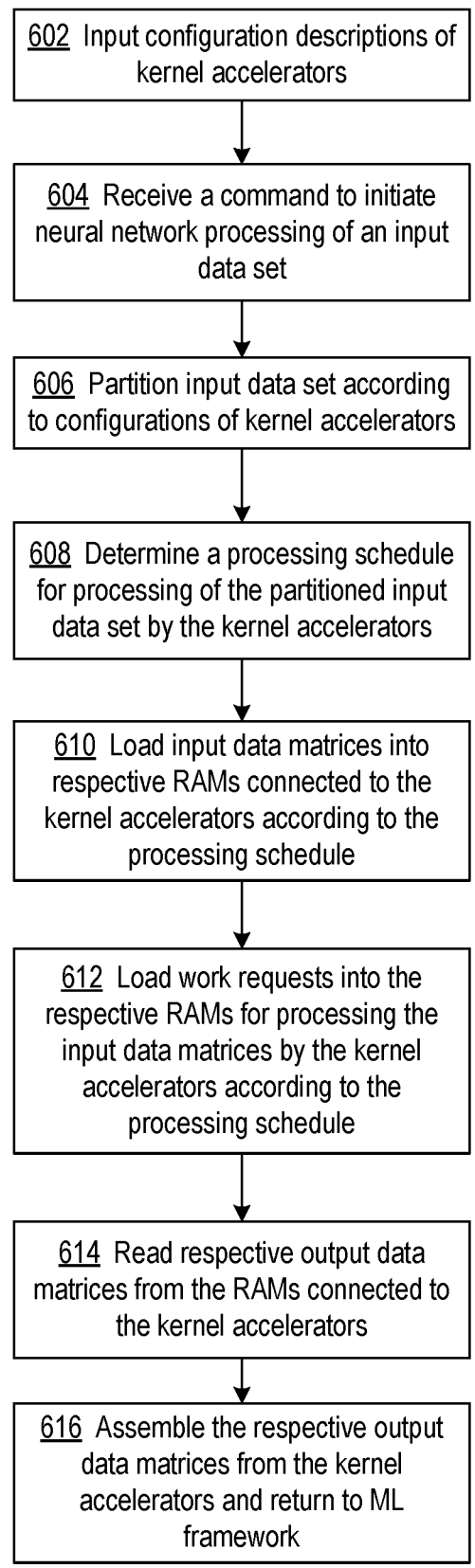
FIG. 6 is a flowchart of a process performed by the KA interface in performing fine-grain parallelization of a task.

FIG. 6 is a flowchart of a process performed by the KA interface 412 in performing fine-grain parallelization of a task. Fine-grain parallelization refers to dividing a neural network processing task into subtasks that can be performed in parallel by multiple neural network accelerators. In some implementations, the KA interface divides a neural network processing task according to different capabilities of the neural network accelerators. For example, one neural network accelerator may have a larger systolic array of multiplier-accumulator circuits than another neural network accelerator, and the KA interface can partition the input data set and provide a larger input data matrix to the neural network accelerator having the larger systolic array than to the neural network accelerator having the smaller systolic array. At block 602, the KA interface inputs data that describe configurations of the neural network accelerators. The neural network accelerator descriptions may be provided by user input, for example.

At block 604, the KA interface 412 receives a command from the ML framework 410 to initiate neural network processing of an input data set. The requested neural network processing is dependent on the neural network application implemented by the ML framework. The ML framework can request processing of one or more layers of the neural network.

The KA interface partitions, reshapes, or merges the input data set into the input data matrices according to the configurations of the neural network accelerators at block 606. The data can be reshaped in different scenarios. For example, in one scenario, data array formats can be different between the ML framework and the compute array, such as row-major format in the ML framework and a custom format needed for the matrix multiplier systolic array. In another scenario, different types of neural network operations use different data formats, such as converting images to matrix columns (im2col) for convolution versus direct operations on matrices in a fully-connected layer. Reshaping the input data set can entail padding the data with zeros to attain the desired dimensions, reordering data, expanding the input data set such as for im2col, and splitting matrices for fine-grain parallelization. An input data set can be merged such as when multiple images are merged together into a batch of images to improve computational efficiency.

At block 608, the KA interface determines a schedule for processing the partitions of the input data set by the neural network accelerators. The schedule orders the subtasks to maintain a full pipeline of input data for the neural network accelerators. The processing schedule can be generated by traversing the ML framework graph that describes the neural network. Operations or groups of operations are matched with the accelerator unit compute capabilities, and partitioning of data is matched with kernel DDR connectivity (dedicated RAMs). Similarly, the operations are synchronized so that the results from processing the previously partitioned data can be merged together.

At blocks 610 and 612, the KA interface loads the partitions of the input data set and associated work requests into the respective RAMs of the neural network accelerators according to the processing schedule. In some implementations, the KA interface specifies dependencies between events of the neural network accelerators in writing the input data matrices and work requests to the RAMs. The dependencies order the writing of work request and data to the different RAMs in order to maintain a full pipeline of work requests and data transfers to the neural network accelerators. For example, the DMA interface may write a work request and data to the RAM of a second neural network accelerator before writing a work request and data to the RAM of a first neural network accelerator, when in order to maintain a full pipeline of work requests and data, the first neural network accelerator should receive its work request and data before the second neural network accelerator receives its work request and data. The KA interface can be programmed to implement dependencies between write operations to the neural network accelerators and between read operations from the neural network accelerators to maintain a desired order and keep a full pipeline of work requests and data. For example, the specified dependencies between two neural network accelerators can be:

DDR write to KA-1→DDR write to KA-2
DDR read from KA-1→DDR read from KA-2 to indicate that the write to the RAM of neural network accelerator KA-2 is dependent on completion of the DDR write to the RAM of neural network accelerator KA-1, and that the read from the RAM of KA-2 is dependent on completion of the DDR read from the RAM of KA-1.

At block 614, the KA interface reads the generated output data from a RAM coupled to a neural network accelerator in response to a completion signal from the neural network accelerator. The reading of the respective output data matrices from the RAMs can be in the order specified by the dependencies described above. At block 616, the KA interface assembles the output matrices into a single matrix for the ML framework.

Figure 7:
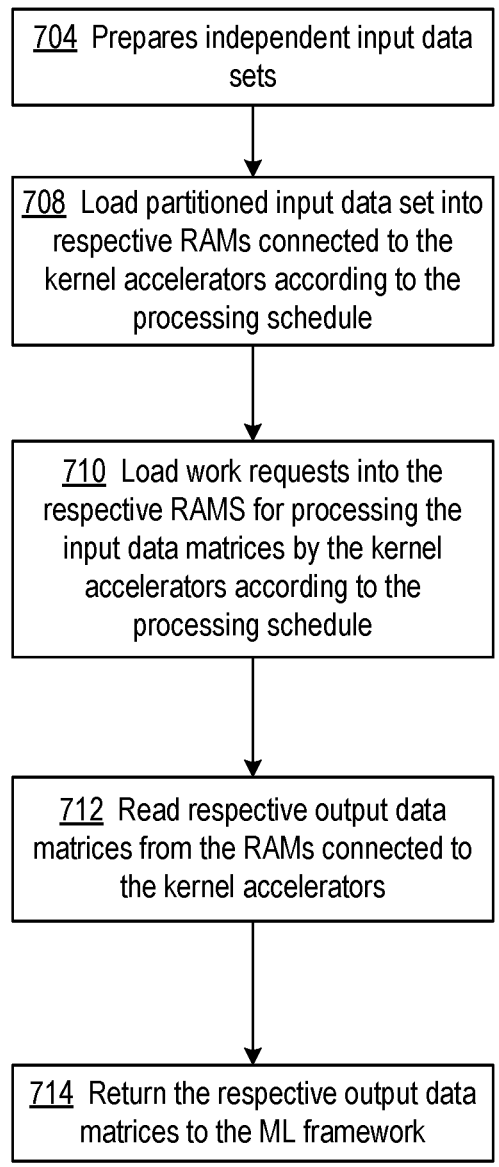
FIG. 7 is a flowchart of a process performed by the KA interface in performing coarse-grain parallelization of a neural network task in which the neural network task does not involve dependencies between input data sets.

FIG. 7 is a flowchart of a process performed by the KA interface 412 in performing coarse-grain parallelization of a neural network task in which the neural network task does not involve dependencies between input data sets (such as batches of images in a CNN). An exemplary ML application in which coarse-grain parallelization can be employed is convolution on a batch of images. Each batch in one convolution is an independent unit of work and can be enqueued asynchronously to the neural network accelerators. Each batch specifies a similar unit of work, for example, im2col and GEMM. The neural network accelerators can therefore be saturated with work requests by a round-robin scheduling algorithm.

At block 704, the KA interface prepares independent data sets (such as batches of input images). The KA interface loads the input data matrices and associated work requests into the respective RAMs coupled to the neural network accelerators at blocks 708 and 710. For independent work requests, the work requests and input data matrices can be loaded according to a round-robin scheduling algorithm. At block 712, the KA interface reads the generated output data from a RAM coupled to a neural network accelerator in response to a completion signal from the neural network accelerator. At block 714, the KA interface returns the output data matrices to the ML framework in the order of completion.

Figure 8:
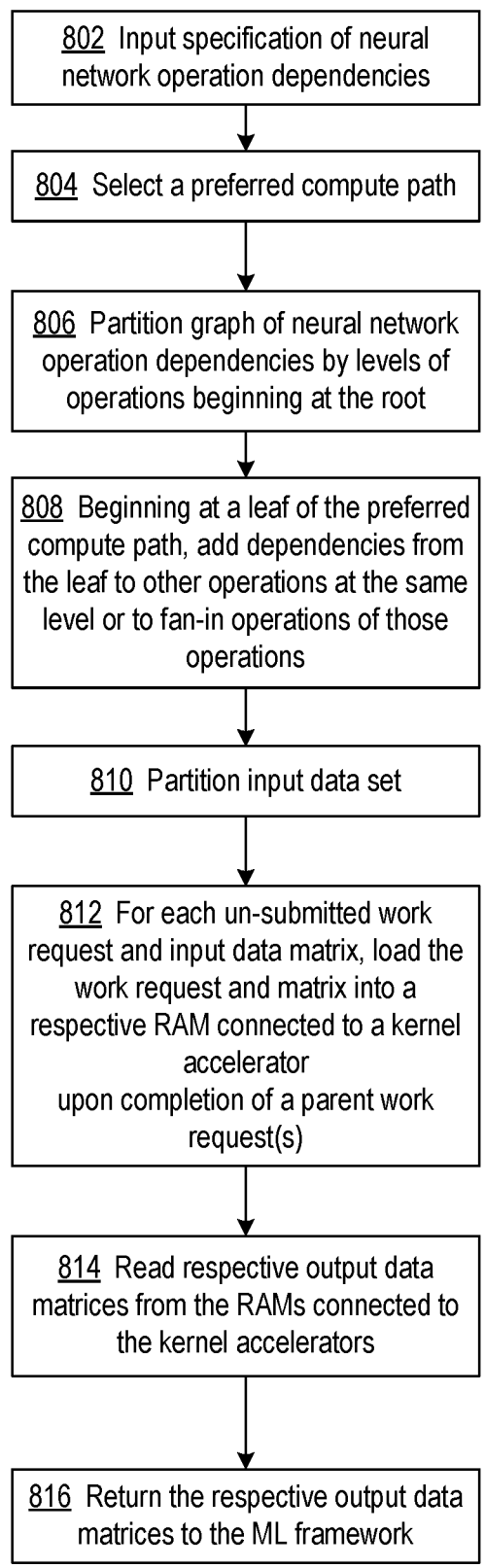
FIG. 8 is a flowchart of a process performed by the KA interface in performing coarse-grain parallelization of a neural network task in which the neural network task has dependencies between layers.

FIG. 8 is a flowchart of a process performed by the KA interface 412 in performing coarse-grain parallelization of a neural network task in which the neural network task has dependencies between layers. Some neural networks have multiple convolution branches in each inception module. The branches can be executed in parallel with one another, but the branches may not entail the same amount of computation. For neural network of these types, the ML framework 410 constructs a directed graph that specifies dependencies between the neural network operations. The vertices of the graph represent respective neural network operations, and the edges represent dependencies between operations. That is, a directed edge from a first vertex to a second vertex indicates that the operation represented by the second vertex is dependent on completion of the operation represented by the first vertex. The KA interface creates streams to represent the available neural network accelerators, one stream for each neural network accelerator. The KA interface dispatches neural network operations in the graph as the dependencies are satisfied.

At block 802, the KA interface inputs a specification of neural network dependencies from the ML framework. The specification may be a directed graph as described above.

Figure 9:
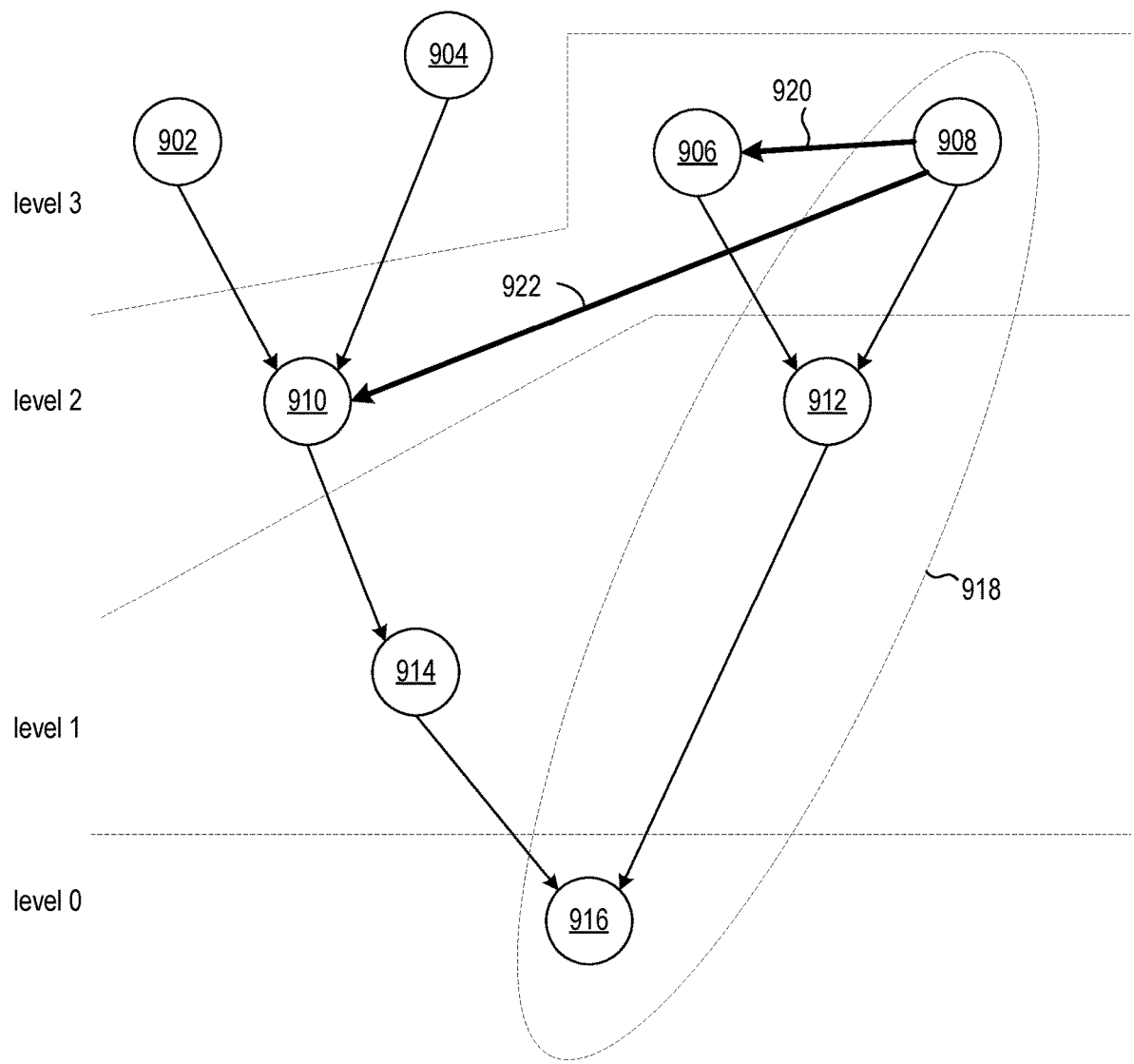
FIG. 9 shows an exemplary directed graph of dependencies of a neural network.
Figure 10:
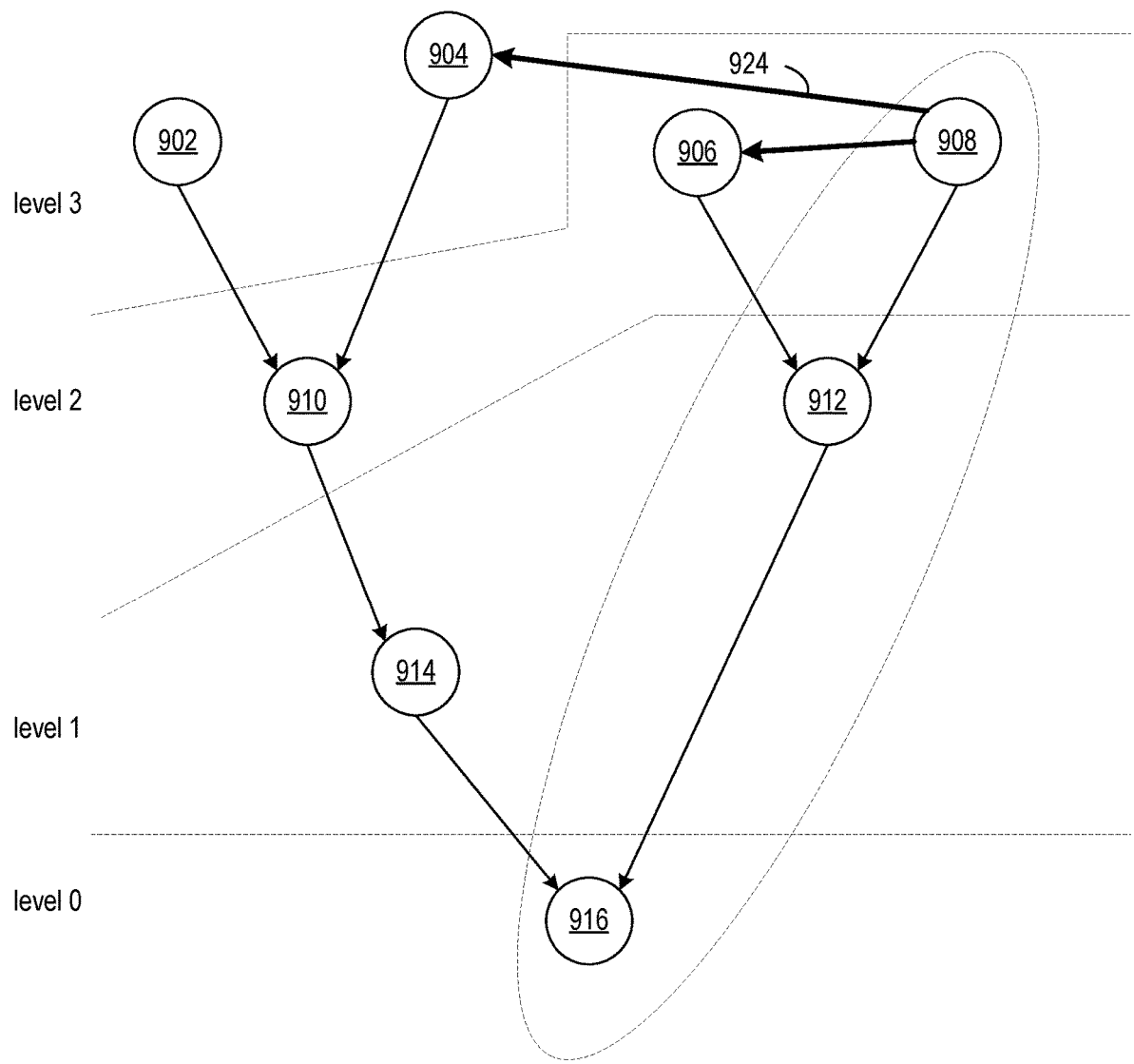
FIG. 10 shows the exemplary directed graph of FIG. 6 with a dependency added to the fan-in of a vertex.

In order to reduce computation time, the KA interface selects a preferred compute path from the directed graph and adds additional dependencies from the operations in the preferred path to operations not in the preferred path. Blocks 804-808 and FIGS. 9-10 show the processing associated with adding dependencies for the preferred compute path. At block 804, the KA interface selects the preferred compute path. The selection of the preferred path can be made based on types of neural network operations, the batch size, and the sizes of input matrices. The primary goal of selecting a preferred path is to avoid stalls due to DMA and the neural network accelerators working on too many unrelated tasks in parallel. Overall, the selection optimizes for throughput or latency of the neural network processing system 400.

At block 806, the KA interface partitions the graph by levels of operations beginning at the root of the graph. Turning briefly to FIG. 9, an exemplary directed graph is shown. The directed graph has vertices 902, 904, 906, 908, 910, 912, 914, and 916. The preferred compute path 918 selected by the KA interface includes vertices 908, 912, and 916. The operation associated with vertex 916 depends on completion of the operation associated with vertex 912, and the operation associated with vertex 912 depends on completion of the operation associated with vertex 908. Partitioning of the graph is based from the root of the graph, which is vertex 916. The partitioned levels of the graph are separated by dashed lines in the diagram. The level 0 partition includes root vertex 916. Moving up the graph one level from the root, level 1 includes vertices 912 and 914. The next level 2 includes vertices 906, 908, and 910, and level 3 includes vertices 902 and 904.

Returning now to FIG. 8, the KA interface adds dependencies to the directed graph at block 808. The process begins at the leaf vertex of the preferred compute path, which is vertex 908 in the example of FIG. 9. In one implementation, dependencies are added from the leaf vertex to other vertices in the same level of the graph. The example of FIG. 9 shows the addition of dependencies from vertex 908 to vertices 906 and 910 by edges 920 and 922, respectively. In an alternative implementation, instead of adding an edge to the vertices in the same level, an edge can be added to the fan-ins of the vertices at the same level. Turning to FIG. 10, the exemplary directed graph of FIG. 9 is shown with the dependency added to the fan-in of a vertex. Instead of adding an edge from vertex 908 to vertex 910, edge 924 is added to connect vertex 908 to vertex 904, which is a fan-in of vertex 910. The KA interface continues to add dependencies from vertices at other levels of the preferred compute path to vertices in other paths as described above, proceeding level-by-level from the leaf vertex 908 to the root 916.

Returning now to FIG. 8, the KA interface partitions the input data set into individual input data matrices at block 810. At block 812, the KA interface loads the input data matrices and associated work requests into the respective RAMs coupled to the neural network accelerators in the order specified by the dependency graph, beginning with the preferred compute path. The KA interface waits to write each un-submitted work request and input data matrix to a RAM until a parent work request is complete. A parent work request of an un-submitted work request is a work request having a neural network operation upon which a neural network operation of the un-submitted work request depends as indicated by the dependency graph.

At block 814, the KA interface reads the generated output data from a RAM coupled to a neural network accelerator in response to a completion signal from the neural network accelerator. At block 816, the KA interface returns the output data matrices to the ML framework in the order of completion.

Figure 11:
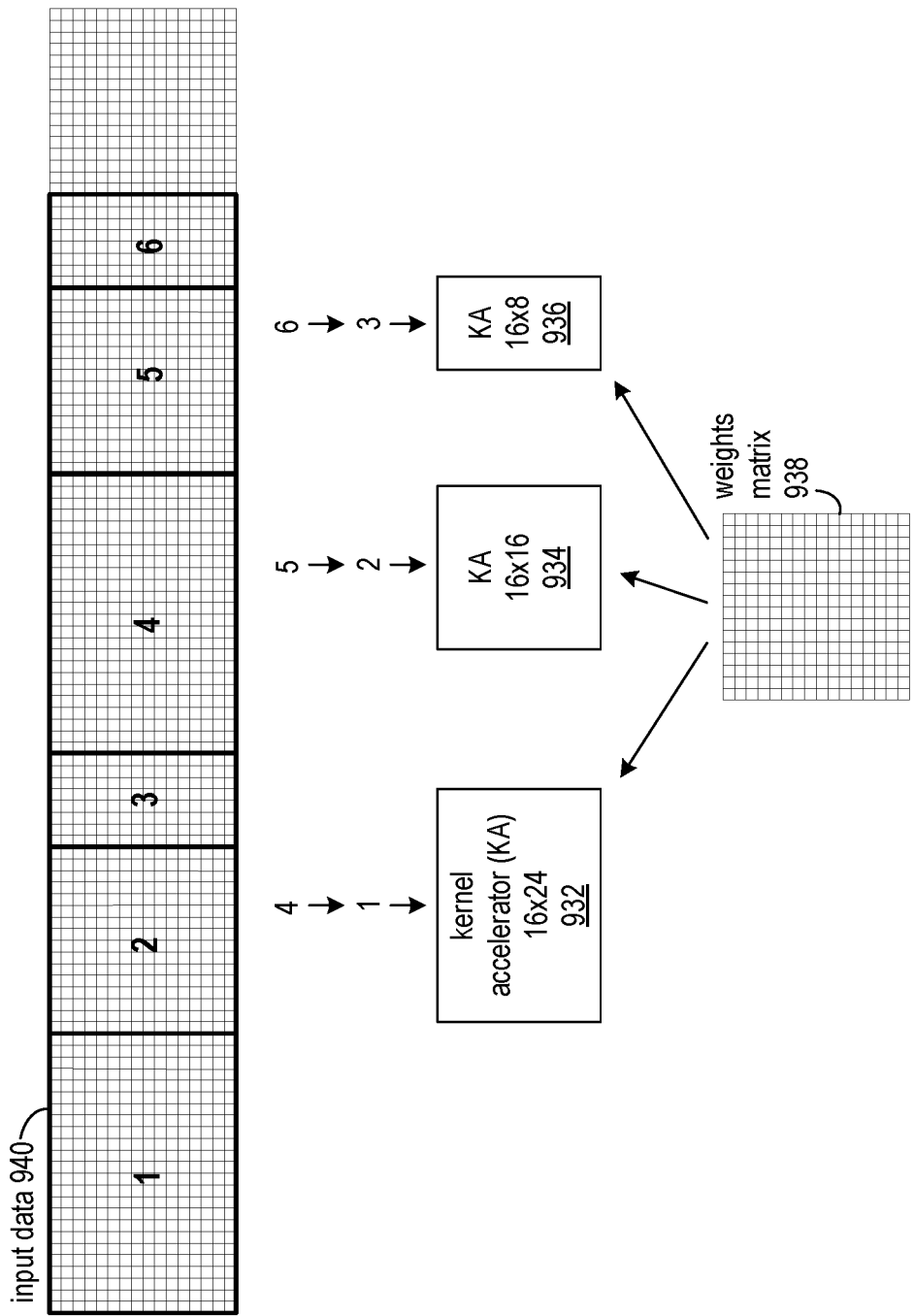
FIG. 11 illustrates partitioning of an input data set for processing by three neural network accelerators according to an interleaved schedule.

FIG. 11 illustrates partitioning of an input data set 940 for processing by three neural network accelerators according to an interleaved schedule. The input data set has dimensions 16×N, and each of the neural network accelerators 932, 934, and 936 is configured to process 16 rows of the weights matrix 938. Neural network accelerators 932, 934, and 936 have different sizes. That is, the matrix multiplier arrays 362 in the neural network accelerators have arrays of multiplier-accumulator circuits having different dimensions. Neural network accelerator 932 can process up to 24 columns of the input data set, neural network accelerator 934 can process up to 16 columns of the input data set, and neural network accelerator 936 can process up to 8 columns of the input data set.

The KA interface partitions the input data set 940 into matrices for processing by the neural network accelerators 932, 934, and 936. Though not shown, it will be recognized that each of the neural network accelerators has dedicated RAM(s) for the input data set 940 and the weights matrix 938. That is, the RAM(s) used by each of the neural network accelerators are not shared with the other neural network accelerators.

The schedule for processing the input data set 940 by the neural network accelerators 932, 934, and 936 is interleaved in that the order of the partitions in the data set is based on the order in which the partitions are assigned to the neural network accelerators for processing. In the example, the host will assign partition 1 to neural network accelerator 932, partition 2 to neural network accelerator 934, and partition 3 to neural network accelerator 936. Once neural network accelerator 932 has completed processing partition 1, the host will assign partition 4 to neural network accelerator 932; once neural network accelerator 934 has completed processing partition 2, the host will assign partition 5 to neural network accelerator 934; and once neural network accelerator 936 has completed processing partition 3, the host will assign partition 6 to neural network accelerator 936. The host continues to partition and provide the input data matrices to the neural network accelerators until neural network processing of the input data set is complete. The host then repeats the process for the next input data set.

Figure 12:
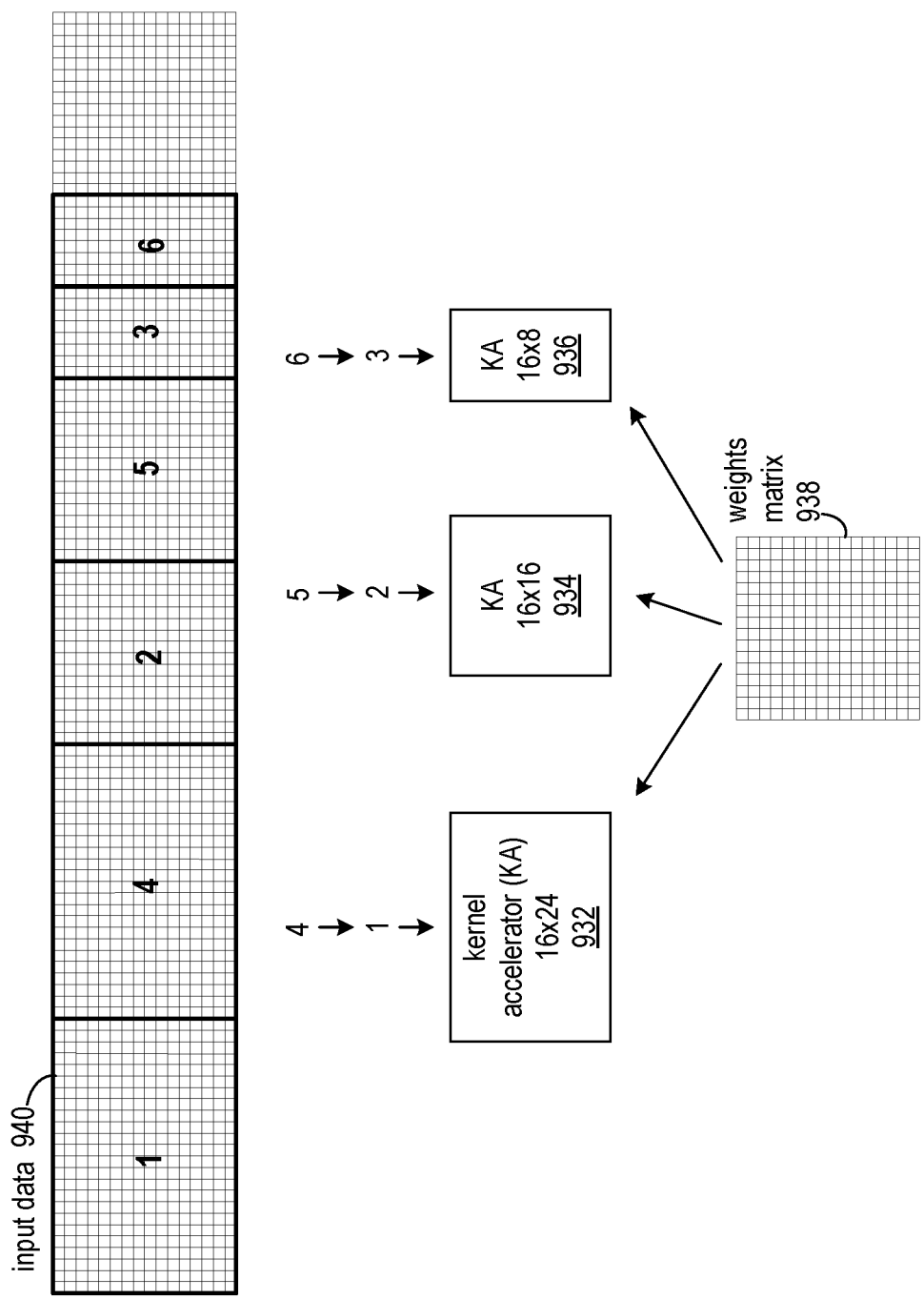
FIG. 12 shows partitioning of an input data set for processing by three neural network accelerators according to a linear schedule.

FIG. 12 shows partitioning of an input data set 940 for processing by three neural network accelerators according to a linear schedule. The example of FIG. 10 involves the same neural network accelerators 932, 934, and 936, input data set 940, and weights matrix 938 as described above in regards to FIG. 11. The schedule for processing the input data set 940 by the neural network accelerators 932, 934, and 936 is linear in that the order of the partitions in the input data set is based on which of the neural network accelerators will be assigned to process the partitions. The partitions assigned to neural network accelerator 932 are first in the order, the partitions assigned to neural network accelerator 934 are second in the order, and the partitions assigned to neural network accelerator 936 are third in the order. In the example, the host will assign partition 1 to neural network accelerator 932, partition 2 to neural network accelerator 934, and partition 3 to neural network accelerator 936. Once neural network accelerator 932 has completed processing partition 1, the host will assign partition 4 to neural network accelerator 932; once neural network accelerator 934 has completed processing partition 2, the host will assign partition 5 to neural network accelerator 934; and once neural network accelerator 936 has completed processing partition 3, the host will assign partition 6 to neural network accelerator 936.

Figure 13:
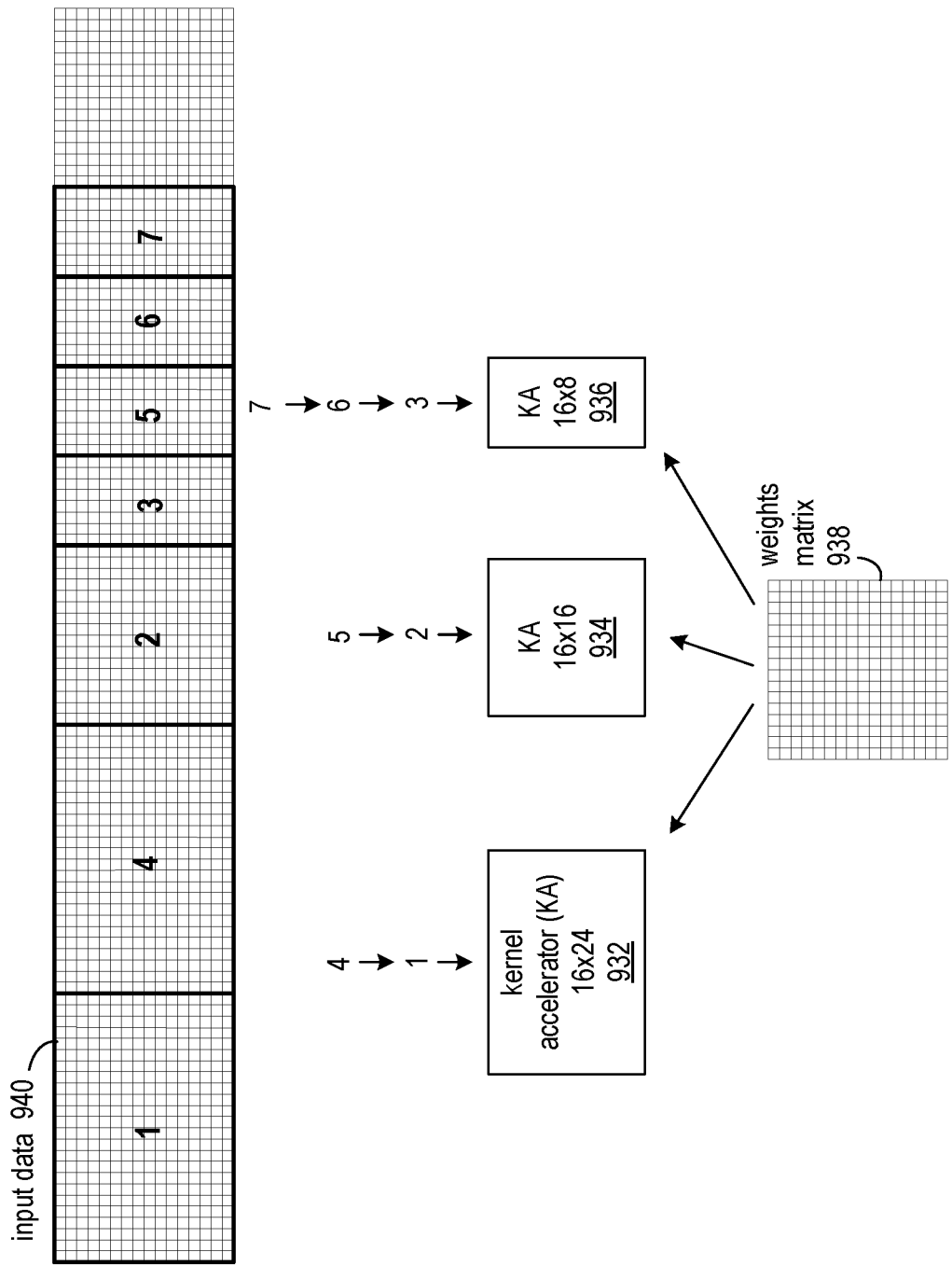
FIG. 13 shows partitioning of an input data set for processing by three neural network accelerators according to a schedule in which a neural network accelerator is tasked for processing different sizes of input matrices.

FIG. 13 shows partitioning of an input data set 940 for processing by three neural network accelerators according to a schedule in which a neural network accelerator is tasked for processing different sizes of input matrices. The example of FIG. 13 involves the same neural network accelerators 932, 934, and 936, input data set 940, and weights matrix 938 as described above in regards to FIG. 11.

The example illustrates that the host can re-task neural network accelerators according to varying processing needs. In the example, the host will assign partition 1 to neural network accelerator 932, partition 2 to neural network accelerator 934, and partition 3 to neural network accelerator 936. Once neural network accelerator 932 has completed processing partition 1, the host will assign partition 4 to neural network accelerator 932; once neural network accelerator 934 has completed processing partition 2, the host will assign partition 5 to neural network accelerator 934; once neural network accelerator 936 has completed processing partition 3, the host will assign partition 6 to neural network accelerator 936; and once neural network accelerator 936 has completed processing partition 6, the host will assign partition 7 to neural network accelerator 936. Note that even though the neural network accelerator 934 can process a 16×16 input data matrix, partition 5, which is a 16×8 input data matrix, is assigned to neural network accelerator 934.

Figure 14:
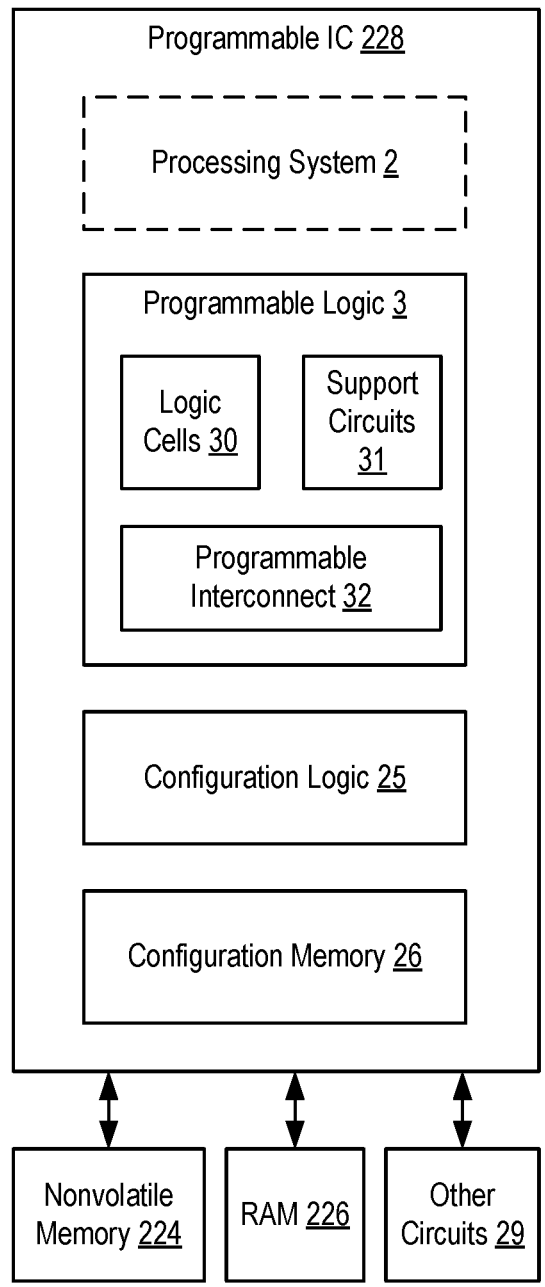
FIG. 14 is a block diagram depicting a programmable IC according to an example.

FIG. 14 is a block diagram depicting a programmable IC 228 according to an example. The programmable IC 228 includes programmable logic 3, configuration logic 25, and configuration memory 26. The programmable IC 228 can be coupled to external circuits, such as the NVM 224, the RAM 226, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 224 or any other source (e.g., the DRAM 226 or from the other circuits 29). In some examples, the programmable IC 228 includes a processing system 2. The processing system 2 can include microprocessor(s), memory, support circuits, 10 circuits, and the like. For example, the processing system 2 can include circuits similar to the processing system 210. In some examples, the processing system 2 can be used in place of the processing system 210. In such case, the entire computing system 108 can be implemented using the programmable IC 228, where the software 206 executes on the processing system 2.

Figure 15:
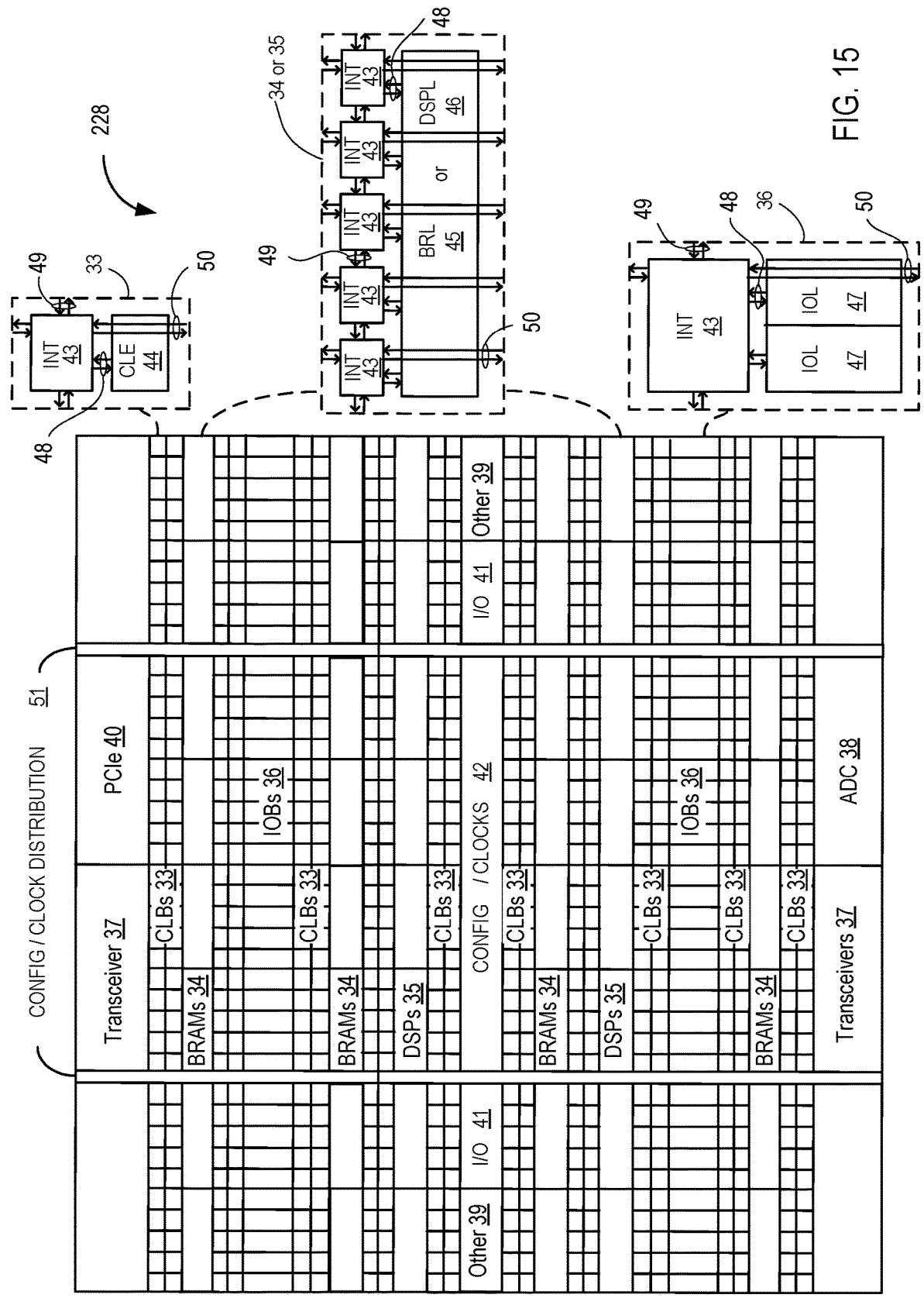
FIG. 15 illustrates an FPGA implementation of a programmable IC.

FIG. 15 illustrates an FPGA implementation of the programmable IC 228 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 15. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 15 include additional logic blocks that disrupt the regular columnar structure making up a large part of the FPGA. The additional logic blocks can be programmable blocks and/or dedicated logic.

Note that FIG. 15 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 15 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for neural network processing. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A neural network processing system, comprising:
a host computer system;
a plurality of RAMs coupled to the host computer system;
a plurality of neural network accelerators coupled to the plurality of RAMs, respectively;
wherein the host computer system is configured with software that when executed causes the host computer system to:
input a directed graph that specifies dependencies between neural network operations, wherein vertices of the graph represent respective ones of the neural network operations, and the edges represent dependencies between the neural network operations;
select a preferred compute path from the directed graph based on optimizing throughput;
add dependencies from vertices in the preferred path to vertices not in the preferred path;
write input data that include input data matrices to the RAMS;
write work requests to the RAMs, wherein each work request specifies a subset of the neural network operations to perform, and specifies memory locations in a RAM of the plurality of RAMs of the input data and parameters for performing the work request and that include the respective weights matrix, a respective input data matrix of the input data matrices, and a respective output matrix, and wherein the work requests are written in the order specified by the dependency graph, beginning with the preferred compute path; and
wherein each neural network accelerator is configured to read a work request from the respective RAM and perform the subset of neural network operations on the input data using the parameters.

2. The neural network processing system of claim 1, wherein the host computer system is configured with software that when executed causes the host computer system to partition, reshape, or merge an input data set into the input data matrices for processing by the plurality of neural network accelerators.

3. The neural network processing system of claim 2, wherein the host computer system is further configured with software that when executed causes the host computer system to:
input descriptions of the neural network accelerators; and
partition the input data set into the input data matrices based on the descriptions of the neural network accelerators.

4. The neural network processing system of claim 3, wherein:
the plurality of neural network accelerators include at least a first neural network accelerator and a second neural network accelerator; and
the respective input data matrix written to the respective RAM that is coupled to the first neural network accelerator is larger than the input data matrix written to the respective RAM that is coupled to the second neural network accelerator.

5. The neural network processing system of claim 2, wherein the host computer system is further configured with software that when executed causes the host computer system to:
wait to write each un-submitted work request of the work requests to a RAM of the plurality of RAMs until completion of a previously submitted work request that specifies a neural network operation on which a neural network operation of the un-submitted work request depends.

6. The neural network processing system of claim 1, wherein the host computer system is further configured with software that when executed causes the host computer system to specify dependencies between events of the neural network accelerators in writing the input data matrices and work requests to the RAMs.

7. The neural network processing system of claim 1, wherein the plurality of neural network accelerators are disposed on a plurality of integrated circuit dies.

8. The neural network processing system of claim 1, wherein the plurality of neural network accelerators have respective arrays of multiplier-accumulator having different dimensions.

9. A method of neural network processing, comprising:
inputting to a host computer system, a directed graph that specifies dependencies between neural network operations, wherein vertices of the graph represent respective ones of the neural network operations, and the edges represent dependencies between the neural network operations;
selecting a preferred compute path from the directed graph by the host computer system based on optimizing throughput;
adding dependencies from vertices in the preferred path to vertices not in the preferred path by the host computer system;
writing by the host computer system, input data matrices to a plurality of RAMs shared by the host computer system and a plurality of neural network accelerators, wherein the plurality of RAMs are coupled to the plurality of neural network accelerators, respectively;
writing work requests to the RAMs in the order specified by the dependency graph, beginning with the preferred compute path, wherein each work request specifies memory locations in a respective RAM of the plurality of RAMs of: a respective weights matrix, a respective input data matrix of the input data matrices, and a respective output matrix, and each work request specifies a subset of neural network operations to perform; and
reading work requests from the respective RAMs by the neural network accelerators; and
performing by the neural network accelerators, the subsets of neural network operations specified by the work requests using the respective weights matrices, input data matrices, and output matrices referenced by the work requests.

10. The method of claim 9, further comprising, partitioning by the host computer system an input data set into the input data matrices for processing by the plurality of neural network accelerators.

11. The method of claim 10, further comprising:
inputting descriptions of the neural network accelerators by the host computer system; and
partitioning the input data set into the input data matrices by the host computer system based on the descriptions of the neural network accelerators.

12. The method of claim 11, wherein the writing the input data matrices includes writing input data matrices of different sizes to the plurality of RAMs.

13. The method of claim 10, wherein the subsets of neural network operations in the work requests are independent of one another.

14. The method of claim 10, further comprising:
waiting by the host computer system to write each un-submitted work request of the work requests to a RAM until completion of a previously submitted work request that specifies a neural network operation on which a neural network operation of the un-submitted work request depends.

15. The method of claim 9, wherein the performing the subsets of neural network operations specified by the work requests by the neural network accelerators includes performing the subsets of neural network operations by the neural network accelerators that are disposed on a plurality of integrated circuit dies.

16. A system, comprising:
a host computer system;
wherein the host computer system is configured with software that when executed causes the host computer system to:
input a directed graph that specifies dependencies between neural network operations, wherein vertices of the graph represent respective ones of the neural network operations, and the edges represent dependencies between the neural network operations;
select a preferred compute path from the directed graph based on optimizing throughput;
add dependencies from vertices in the preferred path to vertices not in the preferred path;
write input data that include input data matrices to a plurality of RAMs; and
write work requests to the RAMs, wherein each work request specifies a subset of the neural network operations to perform by a neural network accelerator of a plurality of neural network accelerators, and specifies memory locations in a RAM of the plurality of RAMs of the input data and parameters for performing the work request and that include the respective weights matrix, a respective input data matrix of the input data matrices, and a respective output matrix, and wherein the work requests are written in the order specified by the dependency graph, beginning with the preferred compute path.

17. The system of claim 16, wherein the host computer system is configured with software that when executed causes the host computer system to partition, reshape, or merge an input data set into the input data matrices for processing by the plurality of neural network accelerators.

18. The system of claim 17, wherein the host computer system is further configured with software that when executed causes the host computer system to:
input descriptions of the neural network accelerators; and partition the input data set into the input data matrices based on the descriptions of the neural network accelerators.

19. The system of claim 17, wherein the host computer system is further configured with software that when executed causes the host computer system to:
wait to write each un-submitted work request of the work requests to a RAM of the plurality of RAMs until completion of a previously submitted work request that specifies a neural network operation on which a neural network operation of the un-submitted work request depends.

20. The neural network processing system of claim 1, wherein the host computer system is further configured with software that when executed causes the host computer system to specify dependencies between events of the neural network accelerators in writing the input data matrices and work requests to the RAMs.

* * * * *